Figure 1:
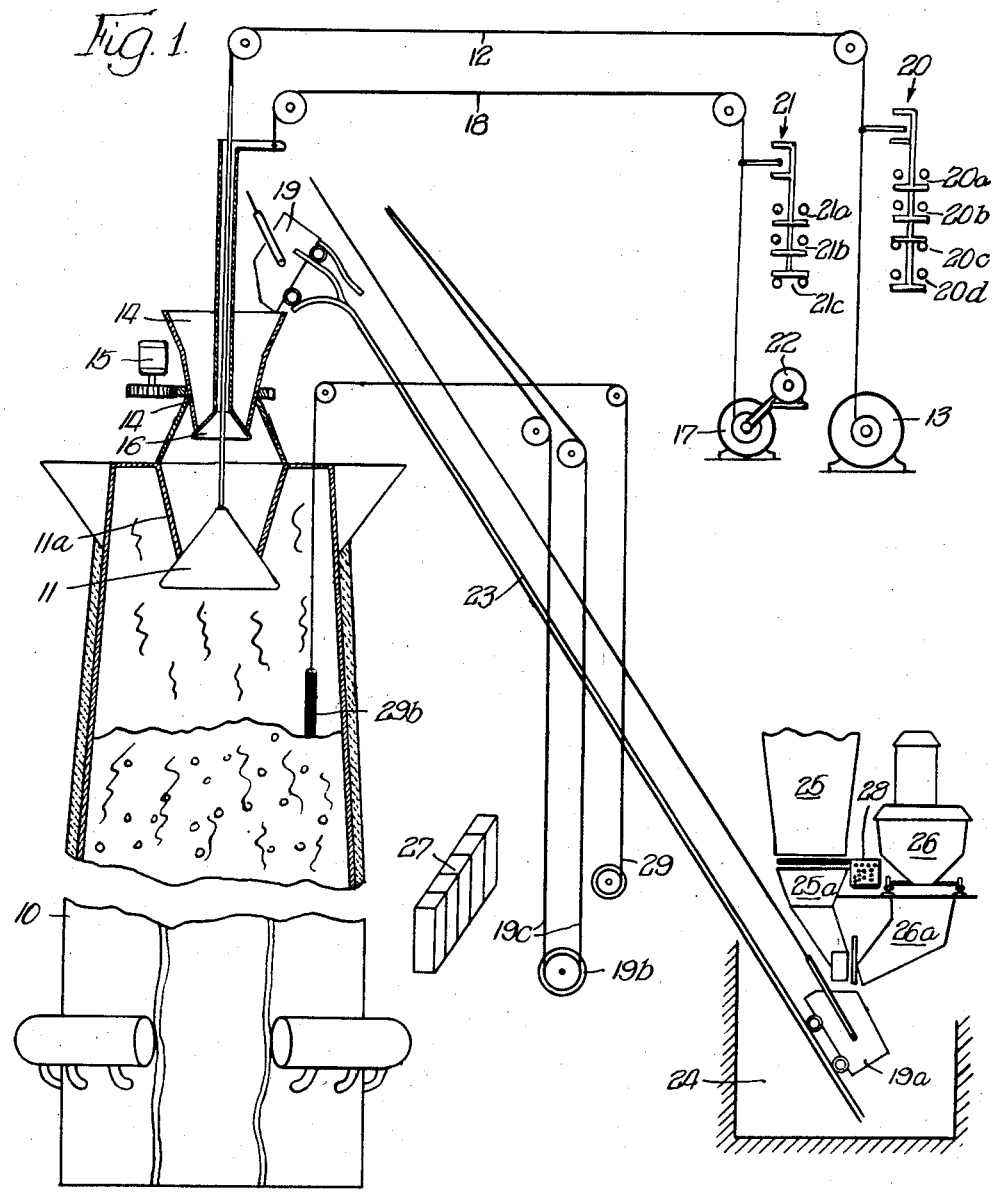

Dec. 11, 1956  A. MOHR, JR., ET AL  2,773,610
PROGRAM CONTROL AND INDICATING SYSTEM
Filed Dec. 11, 1953  4 Sheets-Sheet 1

Inventors
Albert Mohr, Jr
John P Grilli,
By Brown, Jackson, Boettcher + Dienner
Attys

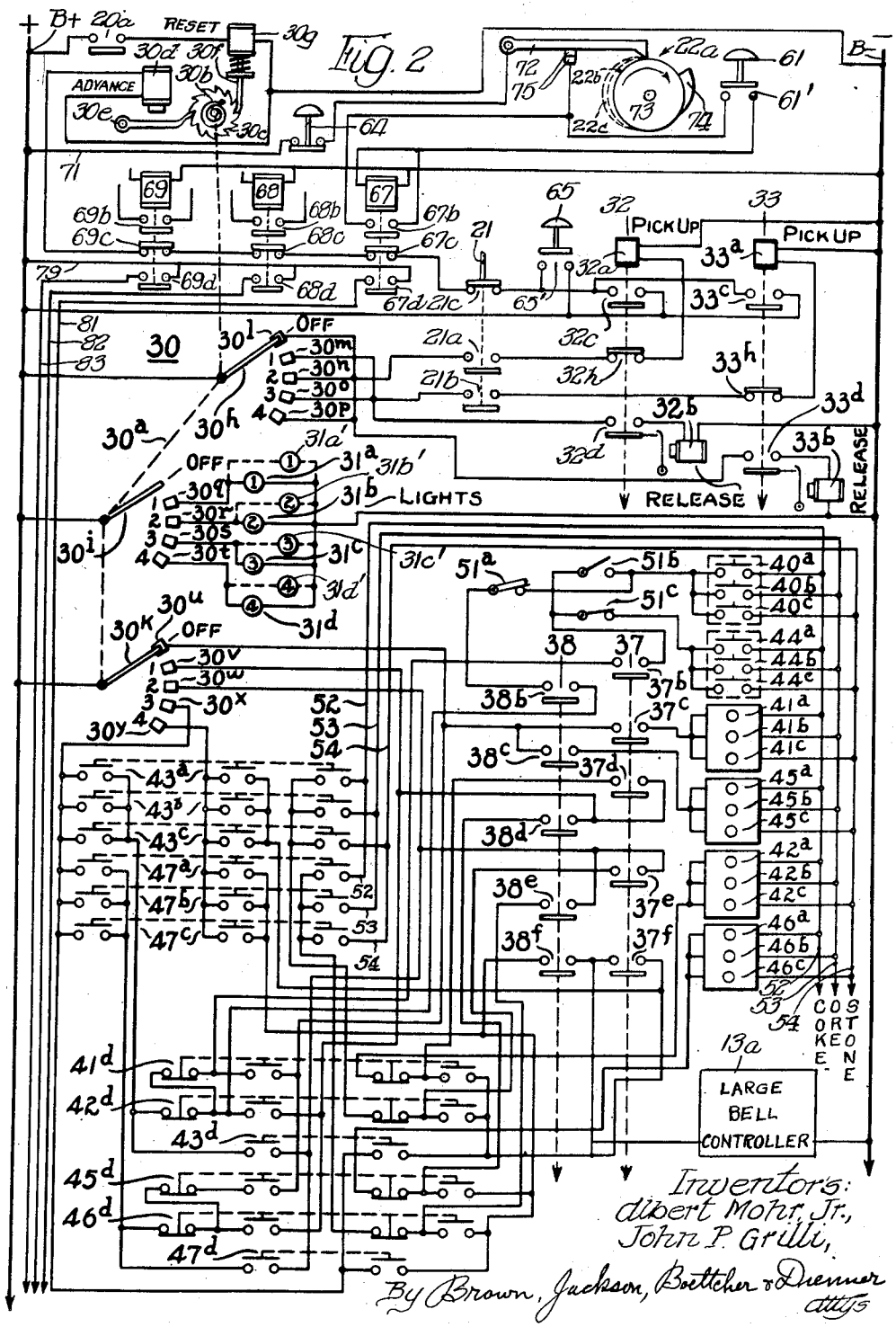

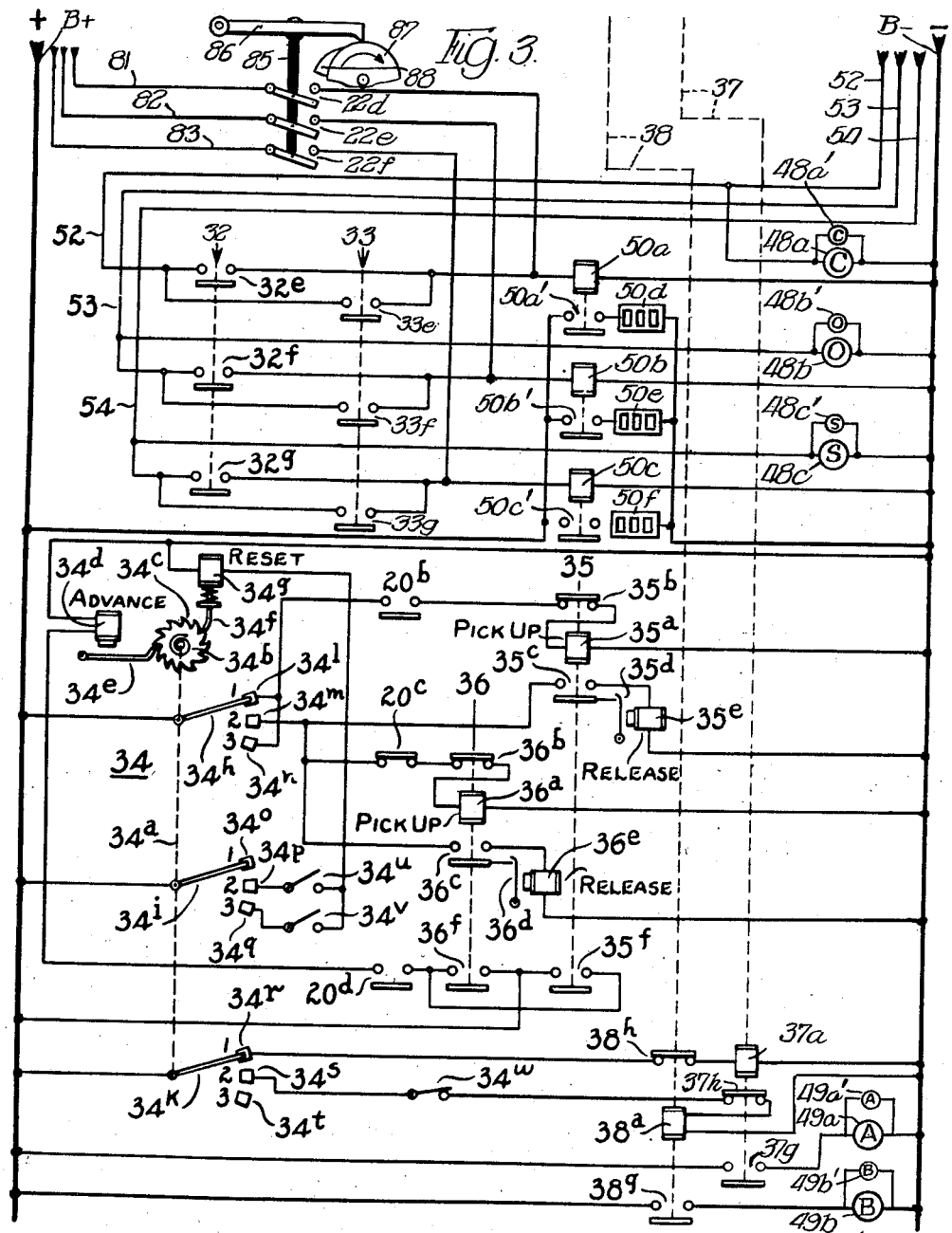

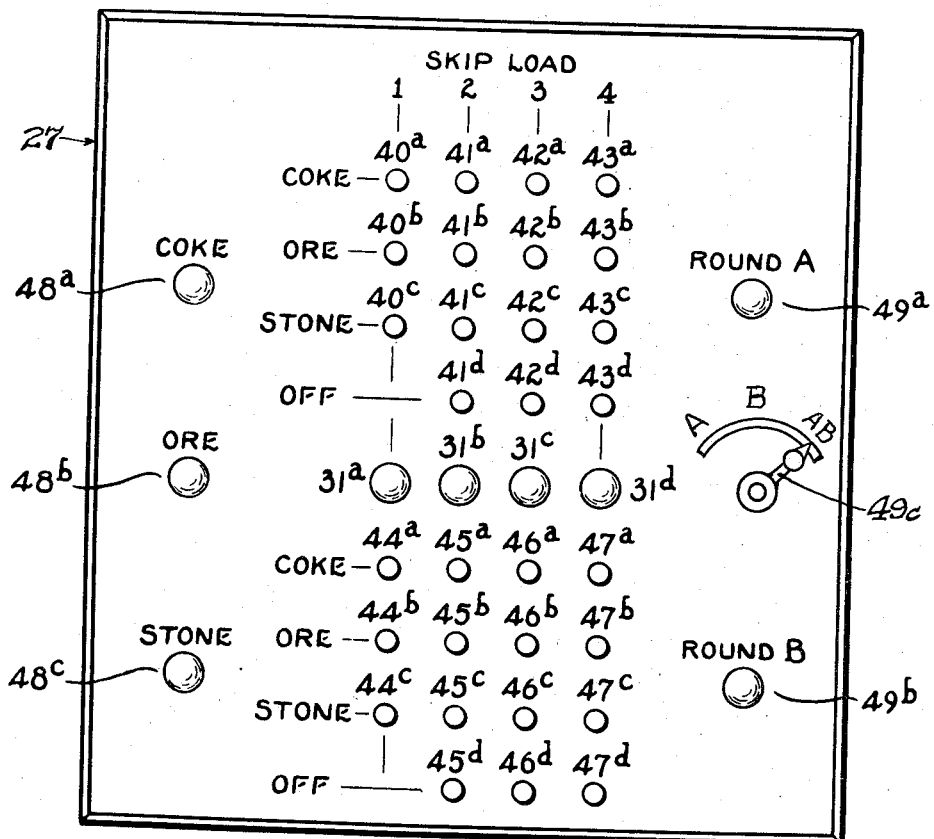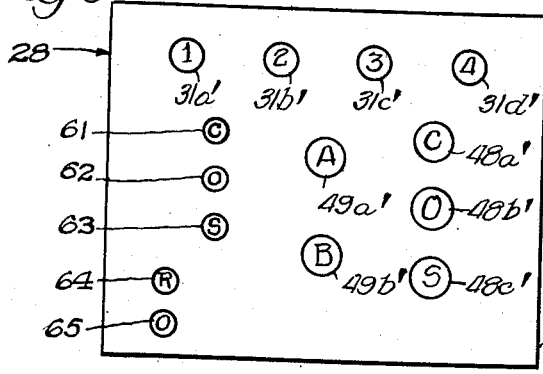

United States Patent Office 2,773,610
Patented Dec. 11, 1956

2,773,610

PROGRAM CONTROL AND INDICATING SYSTEM

Albert Mohr, Jr., and John P. Grilli, Chicago, Ill., assignors to John Mohr and Sons, Chicago, Ill., a corporation of Illinois Application December 11, 1953, Serial No. 397,584

21 Claims. (Cl. 214—19)

The present invention relates to improvements in charging program control and indicating systems which involve a variable plurality of sequentially repeated operations, the sequence of which may be selectively predetermined, such as for the charging systems of blast furnaces and the like.

It is the general practice to charge blast furnaces by a skip hoist arrangement generally comprising two skip cars travelling on parallel tracks between a skip charging pit at the base of the furnace and a distributing hopper at the top of the furnace. These two skip cars are usually connected together in a counterbalancing relation so that while one car is travelling upwardly along its track, the other skip car is travelling downwardly along its track. During each of a plurality of successive operations or rounds of charging the furnace, the skip in the charging pit is loaded with a predetermined quantity of a preselected material, after which the loaded skip is hoisted and dumped into the distributor hopper on top of the furnace. As is well known to those skilled in the art, the hopper is usually rotatable about a vertical axis, and is provided with a cone-shaped movable bottom or "small bell." After a load has been deposited in the distributor hopper, the latter is rotated through a given angle, and is then discharged by the act of lowering the small bell so as to permit the material to drop into a second larger receptacle below the distributing hopper, this lower receptacle also having a cone-shaped movable bottom usually designated as the "large bell." After a number of loads of charging material have thus been accumulated in the lower receptacle on the large bell, the bell is lowered to discharge this accumulated material into the furnace. Depending upon various operating conditions, such as varying characteristics in the charging materials or different desired characteristics of the iron output of the furnace, it is necessary that the sequence in which the various materials are charged into the furnace on successive loads be capable of controlled variation whenever required. This sequence in which the iron ore, coke or stone is charged into the furnace is generally predetermined by the supervisory personnel having charge of the over-all operation of the furnace, and it is desirable that this sequence of charging be set up in a predetermined program by the furnace superintendent or "blower," so as to eliminate or reduce to a minimum the possibility of human error, and also increase the charging capacity of the system by coordinating the various charging operations to give a smooth operating system, with each operation taking place at the proper moment. In the operation of this charging program control system, the scale car operator who performs or governs the operations of charging the skips in the charging pit receives signal indications which specify the kind of material that is to constitute successive loads in the skip cars. The preselected program for successive charges to be delivered to the furnace is set up by the superintendent or blower on a main control panel in the main control room of the furnace, and from this main control panel signal indications are transmitted to a scale car operator's panel located in or adjacent to the skip charging pit, so that the scale car operator can observe from the indications on this latter panel the types of material to be loaded into the successive skips.

After the preselected charging program has been set up on the main control panel, different operating conditions may make it desirable to either add a skip load of ore, coke or stone, or to omit or subtract such a skip load, and provision must be made whereby the furnace superintendent can order such addition or omission of a skip load, and the scale car operator can effect this addition or omission of a skip load at the desired point of the cycle without otherwise disturbing the preselected normal charging program or cycle.

It is desirable to indicate to the scale car operator, preferably by visual signals, such as lights, the material which is to be charged into each skip as it arrives at its loading point in the skip charging pit; and it is also desirable to provide counting, recording and/or indicating signals, usually located at a remote point, to indicate at all times the material which is being and which has been charged into the furnace and/or to totalize separately the total amount of each material charged during a given period.

The general object of our invention is to provide an improved charging program control and indicating system which is so correlated to skip car operation, bell operation, etc. as to obtain certain automatically coordinated functions which greatly increase the charging capacity of the charging system, reduce labor, and eliminate or minimize errors resulting from the human element.

Another more specific object of the invention is to provide such a system embodying novel means for presetting visual means which indicate to the scale car operator the type of material which is to be loaded into each skip while it is at its loading station in the charging pit.

Another object of the invention is to provide such a system including means for indicating the number of skip loads which have been dumped onto the large bell.

Another object of the invention is to provide improved means for totalizing and recording the skip loads of the different materials—iron ore, coke and stone.

Another object of the invention is to provide such a system embodying improved means for indicating a predetermined succession of individual loads of different materials which are to be delivered to the skips.

Another object of the invention is to provide a system which affords the preselection of a plurality of the aforementioned automatic signalling cycles, any one of which may thereafter be made effective selectively by a simple manipulation.

Another object is to provide improved means for affording continuous visual indication of the particular charging cycle with which the furnace is being charged at a given time.

Other objects, features and advantages of the invention will hereinafter appear in the following detail description of one preferred embodiment of our invention. In the accompanying drawings illustrating such embodiment:

Figure 1 is a diagrammatic view of a blast furnace schematically illustrating the skip cars, the apparatus for loading the iron ore, coke and stone into the skip cars, the rotatable distributor hopper for receiving the loads of material from the skip cars, the small and large bells for controlling the dumping of the material into the furnace, and the main control panel located in the main control room, and the scale car operator's panel located adjacent to the skip charging pit;

Figures 2 and 3 constitute the upper and lower parts of a complete circuit diagram of the system, the lower end of Figure 2 being adapted to be joined to the upper end of Figure 3, as indicated by the arrows on the joining conductors;

Figure 4 is a front elevational view of the main control panel which is usually located in the main control room of the furnace; and Figure 5 is a front elevational view of the scale car operator's panel located adjacent to the scale car operator's area of activities in or adjacent to the skip charging pit.

Referring first to Figure 1, we have illustrated at the left a blast furnace 10 of more or less conventional construction. The material charging inlet at the top of the furnace is normally closed by a large bell 11 operable to open and close a large bell receptacle 11a. This large bell is shown as being raised and lowered through a cable 12 connected to lifting and lowering mechanism, diagrammatically indicated at 13. This bell operating mechanism may be of various forms; one of which is typically represented by a reversible electric motor adapted to actuate a control valve which governs the admission and exhaust of fluid under pressure to and from a power cylinder connected with the cable 12. This mechanism has not been illustrated in detail, because it is old and well known to those skilled in the art. The charging top of the furnace also comprises a rotatable hopper 14 arranged to be driven by an electric motor 15, within which rotatable hopper operates a small bell 16. This small bell may be raised and lowered between closed and open positions by lifting and lowering mechanism diagrammatically indicated at 17, the latter connecting with the small bell through a cable 18 or the like. This bell operating mechanism 17 may also be of the motor controlled, fluid pressure operated type, similar to the lifting and lowering mechanism 13 for operating the large bell. All of the above described apparatus is old and well known to those skilled in the art.

As a part of our improved program control and indicating system, we associate a limit switch 20 with the large bell 11 to be responsive thereto, and we associate a limit switch 21 with the small bell 16 to be responsive thereto, these two limit switches being diagrammatically illustrated in Figure 1. The large bell limit switch 20 is provided with contacts 20a, 20b and 20d, which are arranged to open when the large bell is closed, and this limit switch is also provided with contacts 20c which are arranged to close when the large bell is closed. The small bell limit switch 21 is provided with contacts 21a and 21b which are open when the small bell 16 is closed, and is provided with contacts 21c which are closed when the small bell is closed. Also associated with the small bell operating mechanism 17 is a further series of limit switches or control switches collectively indicated at 22. These comprise a series of cam operated limit switches 22a, 22b and 22c (Figure 2) which are associated with the "extra skip load" relays, and also comprise another series of cam operated switches 22d, 22e and 22f which are associated with the coke, ore and stone counting relays (Figure 3), all of which will be hereinafter described in detail.

Referring again to Figure 1, the skip apparatus may be of the single skip or double skip type, preferably the latter, however, wherein the two skip cars 19 and 19a operate on separate tracks 23 and are cable connected in counterbalancing relation, so that one skip car is descending while the other skip car is ascending to the top of the furnace. The hoisting drum and reversely wound hoisting cables for operating the skip cars 19 and 19a are diagrammatically indicated at 19b and 19c respectively. The skip cars receive the coke, ore and stone within a skip charging pit 24. This skip charging mechanism is conventional and well known, being typically illustrated by the coke bin 25 and coke weighing hopper 25a for supplying coke to the skip cars; and also by the scale car 26 and chute 26a for supplying the iron ore and stone to the skip cars 19 and 19a.

The aforementioned main control panel of our improved program control system is diagrammatically indicated at 27, this usually being located in the main control room of the furnace. Responding to the program set up on this main control panel 27 is a scale car operator's panel 28 which is located in the skip loading area, preferably at a point where it may be observed and operated by the scale car operator. Also located in the main control room of the furnace is the usual stock line recording apparatus 29 comprising a recording drum or other instruments indicating the position and movement of the stock line try rod 29b. One preferred form of such stock line recorder is disclosed in our copending application Serial No. 397,446, filed December 10, 1953, and now Patent No. 2,704,401, entitled "Stock Line Recorders."

Figure 4 illustrates the front of the main control board 27 upon which is set up the charging program which is usually predetermined by the supervisory staff having charge of the operation of the furnace. At the top of the control board under the heading "Skip load" are the spaced numerals 1—2—3—4 which denote four vertical columns corresponding to four skip loads. These columns are made up of push button switches and indicating lights. A horizontally extending middle row of lights 31a, 31b, 31c and 31d indicate the number of skip loads on the large bell 11. All of the push button switches 40a to 43d inclusive, which are disposed above this horizontal row of lights are the switches which make up the charging program of one of the rounds, hereinafter designated "Round A." All of the push button switches from 44a to 47d which are disposed below the horizontal row of lights 31a–31d constitute the switches which make up the charging program of a separate round, hereinafter designated "Round B." The two round indicating lights 49a and 49b indicate which round of the program is under operation. For Round A there is a first horizontal row of push-pull switches 40a–43a denoting "Coke;" there is a second horizontal row of push-pull switches 40b–43b denoting "Ore;" and there is a third horizontal row of switches 40c–43c denoting "Stone," whereby any one of these three materials may be charged into the skip car in skip loads 1—2—3—4. Round A also includes a fourth horizontal row of three switches 41d, 42d and 43d, these switches serving to terminate Round A at any desired skip load, as will be hereinafter described. Similarly, Round B has a first horizontal row of coke designating switches 44a–47a, a second horizontal row of ore designating switches 44b–47b, and a third horizontal row of stone designating switches 44c–47c. Similarly, Round B also has a fourth horizontal row of switches 45d, 46d and 47d which can be operated to terminate Round B at any desired skip load. The three vertically aligned indicating lights 48a, 48b and 48c at the left hand side of the control board indicate which charging material is then being signalled to the scale car operator's panel 28. All of the above described program selecting switches on the main control board 27 are preferably of the push key interlocking type wherein the several switches in each vertical row of Round A and in each vertical row of Round B are interconnected in a gang unit or gang assembly. According to this interlocking or gang operating relation, the pushing of any one button in any vertical column releases any previously pushed button either above or below it in that same column of that particular round. These push key switches are old and well known, and it will be understood that they each have the necessary number and arrangement of movable and stationary contacts to effect their intended functions, some of which contacts are illustrated in Figures 2 and 3. The control board 27 also includes a round selector controller 49c comprising a controller handle or the like which can be moved into any one of the following three positions: (1) for causing the continuous repetition of Round A; (2) for causing the continuous repetition of Round B; and (3) for causing the continuously alternating operation of Rounds A and B—as predetermined in the charging program established by the furnace supervisor. This controller operates a plurality of control contacts which will be later described in connection with Figures 2 and 3.

Referring now to the scale car operator's panel 28 illustrated in Figure 5, this panel comprises a horizontal row of indicating lights 31a′, 31b′, 31c′ and 31d′ which indicate the number of skip loads on the large bell 11, corresponding exactly to the indications afforded by the lights 31a–31d of the main control panel 27. Also mounted on the panel 28 is a column of signal lights 48a′, 48b′ and 48c′ which are connected to indicate coke, ore and stone as the next material to be loaded into the skip car, corresponding identically with the indication afforded by the lights 48a, 48b and 48c on the main control panel 27. Also mounted on panel 28 are the round indicating lights 49a′ and 49b′ for denoting Rounds A and B identically with the indication afforded by lights 49a and 49b on the main control board 27. This skip operator's panel 28 is also provided with a series of three push-button switches 61, 62 and 63 which are capable of operation by the skip or scale car operator for adding an extra skip load of either coke, ore or stone respectively, pursuant to instructions transmitted from the superintendent or blower in the control room to the scale car operator. For example, if instructions are transmitted down to the scale car operator to add an extra skip load of coke, he presses push button switch 61; for an extra skip load of ore he presses push button switch 62; and for an extra skip load of stone he presses push button switch 63. The functioning of these "extra skip" push button switches 61, 62 and 63 will be later described in connection with the circuit diagram of Figures 2 and 3. Also mounted on the panel 28 and coacting with the above switches 61–63 is a reset push button switch 64 which enables the scale car operator to restore the apparatus to its previous condition if the scale car operator receives countermanding instructions from the control room to cancel the directions for an extra skip load of one material or the other. Still further, the skip operator's panel 28 also carries a push button switch 65 which performs an "omit" function in the automatic cyclical operation of the program. This skip omitting operation, performed pursuant to instructions from the main control room, omits one skip load from that round of the program, whereupon the system picks up again at the next skip load as though the omitted skip load had never been set up in the program. This will be later described in connection with the circuit diagram.

In practice, a conventional system is generally designed upon the basis of accommodating as many as ten skip loads per round, instead of the four skip loads illustrated on the control board of Figure 4. This makes it possible to obtain a greater range in the actual number of loads per round, seven loads per round being a typical or average number. Also, in actual practice the system is arranged to provide from 1 to 3 different normal rounds in addition to a supplemental round, rather than being limited to one normal round and one supplemental round, as illustrated on the control board of Figure 4. However, for simplicity of illustration, we have illustrated a system having only four skip loads per round and having only two rounds, but this disclosure will illustrate the fundamental construction and operation of the larger system, the latter only being an extension of the system herein disclosed with respect to the number of skip loads per round and the number of rounds available for setting up in the program.

Referring now to the circuit diagram of Figuers 2 and 3, the various electrical parts of the system are preferably energized from a direct current supply circuit represented by positive bus B+ and the negative bus B−. The program control system is coordinated with the travel of the skip cars 19, 19a through the instrumentality of a skip selector rotary switch designated 30 in its entirety (Figure 2). This skip selecting rotary switch has an operating shaft 30a represented by the three sections of dotted lines at the left of Figure 2. This shaft 30a is biased in a counterclockwise direction by the torsion spring 30b which is shown as having one end attached to the ratchet wheel 30c, which is secured to the shaft 30a for imparting stepping impulses thereto. An advancing or stepping magnet 30d is adapted upon energization to actuate the stepping pawl 30e which steps the ratchet wheel 30c in a clockwise direction against the bias of the spring 30b. The rotary switch is releasably held in each of its forwardly stepped positions by a releasable holding pawl 30f which normally engages the teeth of the ratchet wheel 30c, but which is adapted to be released therefrom upon the energization of a resetting magnet 30g. The forward stepping motion of the switch is imparted to three rotary switch arms 30h, 30i and 30k, which are mounted on the shaft 30a, but insulated from each other and from the shaft. Each rotary switch arm has a separate supply connection to positive bus B+. The switch arm 30h is adapted to make successive contact with stationary contacts 30l to 30p; the switch arm 30i is adapted to make successive contact with stationary contacts 30q to 30t; and the third switch arm 30k is adapted to make successive contact with stationary contacts 30u to 30y respectively. Connected between the contacts 30q to 30t and the negative bus B− of the power supply line are the signal lights 31a, 31b, 31c and 31d which constitute the horizontal middle row of lights on the main operating panel 27 for indicating to the superintendent or blower in the main control room the position of the skip selecting rotary switch at all times. Connected in shunt of each of these lights 31a to 31d are the complementary lights 31a′ to 31d′ which are mounted on the scale car operator's panel 28 for also indicating to that operator the position of the skip selecting rotary switch 30. As previously described, these indicating lights show the number of loads which has been discharged on the large bell 11.

Cooperating with the skip selecting rotary switch 30 are two control relays 32 and 33 of the latching type. The control relay 32 comprises a pick-up electromagnet 32a and a latching electromagnet 32b. When the pick-up magnet 32a is energized the relay armature is attracted and is mechanically latched in its attracted position. When the latch magnet 32b is energized, this releases the latching relation and allows the relay armature to return to normal position. The relay 32 is provided with normally open contacts 32c, 32d (Figure 2), 32e, 32f and 32g (Figure 3). It is also provided with a pair of normally closed contacts 32h (Figure 2). The other control relay 33 also has a pick-up magnet 33a and a latch releasing magnet 33b. This latter relay has normally open contacts 33c, 33d (Figure 2), 33e, 33f and 33g (Figure 3). It is also provided with one pair of normally closed contacts 33h (Figure 2).

Referring to the top of Figure 2, the operation of resetting the rotary stepping switch 30 is performed by the contacts 20a of the limit switch 20 responding to the large bell 11. It will be noted that these limit switch contacts 20a control a circuit extending from the positive supply bus B+ through the reset electromagnet 30g to the opposite supply bus B−. The operating relation is such that when the large bell 11 opens to dump the several skip loads which have accumulated thereon, the limit switch contacts 20a close this circuit to energize the reset magnet 30g for returning the rotary stepping switch back to its "off" position. The rotary switch is adapted to be stepped or advanced forwardly by the completion of a circuit extending from positive bus B+ through control relay contacts 33c (or through control relay contacts 32c which are in parallel with the contacts 33c), thence through the normally closed contacts 21c of the small bell limit switch 21 to one side of the stepping electromagnet 30d. The other side of the stepping electromagnet is connected to the other supply bus B−. Interposed in series in the conductor leading from limit switch contacts 21c to the stepping magnet 30d are three sets of normally closed contacts which are adapted to respond to three "extra skip" relays to be later described. Normally, these extra skip relays are de-energized and do not affect the operation of the rotary stepping switch 30. It is only when one of these extra skip relays is energized, as for the addition of an extra skip load of coke, ore or stone, that the aforementioned supply circuit to the stepping magnet 30d is interrupted for preventing the forward stepping of the rotary switch at this time.

Referring to the first rotary switch arm 30h, it will be noted that the alternate stationary contacts 30l, 30n and 30p, associated with this switch arm, are jointly connected through control relay contacts 33d and latch release coil 33b to the negative bus; and are also connected through contacts 21a, 32h and pick-up coil 32a to the negative line. The other two stationary switch contacts in this series, designated 30m and 30o, are connected through contacts 21b, 33h and pick-up coil 33a of control relay 33 to the negative bus. Also, following energization of relay 32, these same switch contacts 30m and 30o are connected through contacts 32d and through latch release coil 32b to the negative line. The interaction between the bell controlled limit switches 20 and 21, the rotary stepping switch 30, and the control relays 32 and 33 will be more apparent in a later description.

Referring now to the other rotary stepping switch 34, illustrated in Figure 3, this rotary switch functions as a round selecting switch for selecting the round which is to be charged into the blast furnace. This rotary switch 34 is generally similar in construction and operation to the skip selecting rotary switch 30 described above. The switch 34 has an operating shaft 34aa, diagrammatically indicated by dotted line, which shaft is normally biased in a counterclockwise direction by the torsion spring 34b. The ratchet wheel 34c attached to the shaft 34a is adapted to be stepped in a clockwise direction by the energization of the advancing electromagnet 34d which actuates the stepping pawl 34e to rotate the switch shaft step-by-step in a clockwise direction. The switch shaft is normally held in each of its forwardly stepped positions by the releasable holding pawl 34f which is adapted to be disengaged from the ratchet wheel upon energization of the resetting magnet 34g, substantially as described of the rotary switch 30. The switch shaft simultaneously actuates the three rotary rotary switch arms 34h, 34i and 34k which are insulated from the shaft and from each other, each switch arm having an independent supply connection to the positive bus B+. The switch arm 34h is adapted to make successive contact with stationary contacts 34l to 34n; the switch arm 34i is adapted to make successive contact with stationary contacts 34o to 34q; and the switch arm 34k is adapted to make successive contact with stationary contacts 34r to 34t respectively. The stationary switch contacts 34l and 34n have joint connection with a circuit which extends through the normally open contacts 20b of the large bell limit switch 20, through the normally closed contacts 35b of a latching type relay 35, and thence through the energizing or pick-up coil 35a of this relay 35 to the negative bus. The latter relay 35 is provided with normally open contacts 35c and 35f and is arranged to be latched in the energized or closed position by latch 35d that is adapted to be released by a releasing magnet 35e. The other stationary contact 35m of this first series responding to switch arm 34h is connected in series through the normally open relay contacts 35c and the releasing magnet 35e to the negative line. This same rotary switch contact 34m is also connected in a circuit extending through the normally closed contacts 20c of the large bell limit switch 20, through the normally closed contacts 36b of a latching type relay 36 and thence through the energizing winding 36a of this relay to the negative line. This latter relay 36 is similar in construction to the relay 35 just described, and is provided with normally open contacts 36c and 36f, and is also arranged to be latched in its energized position by a latch 36d adapted to be released by the release magnet 36e. The normally open contacts 36c of the latter relay 36 are operable to establish still another circuit leading from the aforementioned rotary switch contact 34m, through said relay contacts 36c when closed, and thence through the release magnet 36e to the negative line. Referring now to the other gang of stationary switch contacts coacting with the other rotary switch arm 34i, it will be seen that the stationary switch contact 34p is connected through switch contacts 34u which, in their closed position, complete a circuit up through the resetting magnet 34g of rotary switch 34 and thence to the negative line. The next rotary switch contact 34q in this same bank of switch contacts is similarly connected through switch contacts 34v with the same circuit connection leading up through reset magnet 34g and thence to the negative line. These two switches 34u and 34v which are in series respectively with the second step switch contact 34p and with the third step switch contact 34q constitute part of the round selector controller 49c previously referred to in connection with the main control board 27. The sequence in which the operation of the round selector controller 49c opens and closes these two switches 34u and 34v will be later described. The operation of stepping the rotary switch 34 in a forward direction is performed through a circuit which extends from the positive bus through the normally open contacts 35f of relay 35, or alternatively through the normally open contacts 36f of relay 36, and thence through contacts 20d of large bell limit switch 20 to one side of the advancing coil 34d, the other side of this advancing coil being connected to the negative bus.

The round selector portion of the system also includes two round transfer relays designated 37 and 38 which appear in both sheets of the circuit diagram. The round transfer relay 37 is provided with an energizing winding 37a (Figure 3), and it comprises the normally open contacts 37b, 37c, 37d, 37e, 37f and 37g, and also comprises the normally closed contacts 37h (Figure 3). The other round transfer relay 38 is provided with an energizing winding 38a, and comprises normally open contacts 38b, 38c, 38d, 38e, 38f and 38g and comprises normally closed contacts 38h (Figure 3).

Extending down the right hand side of the circuit diagram in Figure 2 are three bus bars 52, 53 and 54 denoted Coke, Ore and Stone respectively. The lower ends of these three bus bars have connection (in Figure 3) with one side of each of their respective signal lights 48a, 48b and 48c which are mounted on the main control board and which indicate coke, ore or stone. The other sides of these three material indicating lights are connected to the negative bus B—. As previously remarked, each of these three material indicating lights 48a, 48b and 48c on the main control panel has a corresponding indicating light connected in shunt thereof, these companion lights being mounted on the scale car operator's panel 28 and being designated 48a', 48b' and 48c'. Thus, it will be seen that whenever positive polarity is connected from the positive bus to the upper end of either one of the coke, ore or stone busses 52, 53 or 54, the corresponding lights designating that material will be lighted on the main control panel and also on the scale car operator's panel. Such energization of the coke, ore and stone busses is effected by the actuation of the push button switches 40b—43c and 44a—47c on the main control panel 27. The connection of these push button switches in the system is illustrated in the drawing and will be more fully explained in connection with the description of the operation of the system. Suffice it to say at present that the switches 40a, 40b, 40c, 41a, 41b and 41c, 42a, 42b and 42c, 44a, 44b and 44c, 45a, 45b and 45c, 46a, 46b and 46c are single pole, single throw switches. It will be noted that all of the switches bearing an "a" suffix denote coke, viz. the switches 40a, 41a, 42a and 43a of Round A, and the switches 44a, 45a, 46a and 47a of Round B. One of the terminals of all of these "a" switches is connected to the coke bus bar 52. Similarly, all of the switches bearing the suffix "b" denote ore, viz. the switches 40b, 41b, 42b, 43b of Round A and the switches 44b, 45b, 46b and 47b of Round B. One terminal of each of these "b" switches is connected to the ore bus bar 53. In like manner, all of the switches bearing the suffix "c" (40c—43c and 44c—47c) denote stone, and one terminal of each of these "c" switches is connected to the stone bus bar 54. The Off switches 41d and 42d of Round A and the Off switches 45d and 46d of Round B each have two normally closed and two normally open sets of contacts. The switches 43a, 43b and 43c of Round A and the switches 47a, 47b and 47c of Round B each have three normally open sets of contacts. The Off switch 43d of Round A and the Off switch 47d of Round B each have two normally open sets of contacts.

Our improved system also embodies counting or totalizing apparatus which separately totalizes the number of skip loads of coke, ore and stone supplied to the furnace over a given period of time. These totalizing counters are stepped forwardly each time that the coke, ore or stone busses 52, 53 or 54 are energized for lighting the lights 48a, 48a', 48b, 48b', etc. Referring to Figure 3, the counting or totalizing operations are performed by the counting relay 50a for coke, by the counting relay 50b for ore, and by the counting relay 50c for stone. The operating coil of the coke counting relay 50a is adapted to be energized from the coke bus 52 alternatively either through the contacts 32e of relay 32 or through the contacts 33e of relay 33. When this coke counting relay 50a is energized it closes contacts 50a' which complete an energizing circuit through a totalizing counter 50d individual to coke. Similarly, the ore counting relay 50b is adapted to be energized from the ore bus 53 either through contacts 32f of relay 32 or through contacts 33f of relay 33. The energization of this ore counting relay 50b closes contacts 59b' which completes a circuit for energizing the ore totalizing counter 50e. In like manner, the stone counting relay 50c is adapted to be energized from the stone bus 54, either by way of contacts 32g of relay 32 or by way of contacts 33g of relay 33. When this stone counting relay 50c is energized its contacts 50c' transmit an energizing pulse to the stone totalizing counter 50f.

Referring back to the round selecting rotary switch 34, it will be seen that the lower rotary switch arm 34k has wiping contact successively with the bank of stationary contacts 34r, 34s and 34t, the switch arm 34k normally having positive potential thereon from the positive bus. Leading from stationary contact 34r is a circuit extending through contacts 38h of relay 38 and thence through the energizing winding 37a of relay 37 to the negative bus bar. Accordingly, when the rotary switch arm 34k is in engagement with stationary contact 34r, and the relay contacts 38h are closed, the relay 37 is energized. The second stationary contact 34s of the rotary switch is connected over a circuit leading through round selector controller contact 34w and thence through contacts 37h of relay 37 to one side of the energizing winding 38a of relay 38, the other side of this winding being connected to negative bus. The round indicating signal lights 49a and 49a', which indicate on the main control panel and on the scale car operator's panel respectively that Round A is in operation, are energized by the round selecting relay 37. This circuit is illustrated at the bottom of Figure 3 and extends from the positive bus through the contacts 37g of relay 37 and thence through the two signal lights 49a and 49a', connected in parallel, to the other supply bus. In like manner, the signal lights 49b and 49b', which indicate on the two panels the fact that the program is operating in Round B, are made responsive to round selector relay 38. This is by way of a circuit leading from positive bus through contacts 38g of relay 38 and thence through the two parallel connected lights 49b and 49b' to the negative supply bus.

The round selector controller 49c mounted on the main control board 27 is arranged to actuate the previously described round selector switches 34u, 34v and 34w of Figure 3. In addition, this round selector controller also actuates the round selector control switches 51a, 51b and 51c of Figure 2, as will be later described.

As described in the fore part of this specificaiton, after the preselected charging program has been set up by the actuation of the appropriate switches 40a—43d and 44a—47d on the main control panel 27, there may arise different operating conditions making it desirable to add a skip load of either ore, coke or stone without otherwise disturbing the preselected charging program which has been thus set up on the main control panel. When the need for this extra skip load arises, the superintendent or blower in the main control room transmits instructions over the intercommunication phone system to the scale car operator at the charging pit, instructing such operator to add a skip load of either coke, ore or stone to the furnace. Thereupon, the scale car operator depresses either one of the push button switches 61, 62 or 63 on his panel 28, depending upon whether the extra skip load is to consist of coke, ore or stone. It will be assumed that push button switch 61 is actuated for an extra skip load of coke, and we shall now describe the apparatus that responds to the actuation of these extra skip load push button switches. Referring to the upper part of Figure 2, it will be seen that the depressing of push button switch 61 closes its contacts 61' which complete an energizing circuit to the coil of one of a series of three extra skip relays 67, 68 and 69, these relays being for coke, ore and stone respectively. The supply circuit for these extra skip relays comprises a conductor 71 extending from the positive bus through the normally closed contacts of the reset switch 64 to the series of three cam operated limit switches 22a, 22b and 22c, which respond to the operation of the small bell 16. These three limit switches 22a–22c are all of the same construction, and in order to avoid unnecessary complication in the circuit diagram we have only illustrated the switch 22a. It comprises a movable switch arm 72 having its movable end riding on the periphery of a cam 73 provided with a cam rise and drop 74. Associated with the movable contact arm 72 are stationary and movable contacts 75 which normally stand engaged, but are adapted to be separated for a brief period of time when the cam rise 74 passes under the outer end of the contact arm. With the contacts 75 standing in their normally closed relation, the supply circuit continues from the contact arm through these contacts 75 to the push button switch contacts 61' and thence to one side of the energizing coil of the extra skip relay 67 corresponding to an extra skip of coke. The other side of this relay coil is connected to the negative supply bus. Accordingly, this relay 67 is energized immediately upon the closing of the extra skip push button switch 61. This relay immediately locks itself up through lock-up contacts 67b which close and establish a shunt across push button contacts 61', whereby the relay remains locked up when the finger is lifted from push button 61. The energization of relay 67 also opens relay contacts 67c which are interposed in series in the conductor 78 which is adapted to carry positive polarity from relay contacts 32c or 33c to one side of the advance coil 30d of rotary switch 30. Hence, this advance coil remains open circuited as long as the extra skip relay 67 is energized, so that no stepping movement can be given the skip selector rotary switch 30, and hence the pre-established program which has been set up on the main control panel is not disturbed or affected by the performance of the extra skip operation. Also responding to energization of relay 67 are relay contacts 67d which are moved into closed position for completing a circuit from supply conductor 79 down through conductor 81 leading to the coke counting relay 50a (Figure 3). In like manner, the extra skip relay 68 calling for ore and the extra skip relay 69 calling for stone are provided with sets of relay contacts 68b, 68c and 68d and 69b, 69c and 69d respectively which perform the same functions as the contacts 67b, 67c and 67d of relay 67. The contacts 68d of ore relay 68 are connected through conductor 82 with the ore counting relay 50b, and the contacts 69d of the stone relay 69 are connetced through conductor 83 with the stone counting relay 50c.

Referring back to the cam operated limit switches 22a, 22b and 22c, the function of these switches is to momentarily interrupt the supply circuit of their associated extra skip relays 67, 68 and 69, whereupon the locked up relation of that particular relay is terminated and the relay is de-energized. This occurs during the latter part of the cycle of the small bell movement, the limit switch opening for about 30° during this part of the cycle. All three limit switches 22a, 22b and 22c are of the same identical construction, each responding to an individual cam which is identical with the cam 73, but insulated from each other.

Following the depressing of either one of the extra-skip push buttons 61, 62 or 63 by the scale car operator, it is desirable that the actual advancement of the corresponding totalizing counter 50d, 50e or 50f be deferred and made dependent upon the extra skip being loaded with the desired material and actually sent to the top of the furnace, with resulting operation of the small bell. Thus, if the instructions for an extra skip load should be suddenly countermanded, before the extra skip has gone up, there will have been no advancement of the corresponding totalizing counter 50d—50f, even though the extra-skip button 61—63 has been depressed. This feature of making the advancement of the totalizing counter dependent upon the upward travel of the skip in an extra-skip operation is accomplished by a series of cam operated limit switches 22d, 22e and 22f (Figure 3) which are interposed in the conductors 81, 82 and 83, leading from the extra skip relays to the counting relays 50a, 50b and 50c. The latter limit switches can be gang connected for simultaneous operation through the medium of an insulating link 85. This switch operating link 85 is suitably connected to a lever 86 which has its movable end riding on the periphery of a cam 87 that rotates synchronously with the above described cams 73 that open the limit switches 22a, 22b and 22c. The cam 87 has a cam hump or rise with a drop-off shoulder designated 88, which operates through the lever 86 to move the three limit switches 22d, 22e and 22f to their closed positions for a brief period of time in the rotation of the cam 87. The timed relation between the hump 88 on cam 87 and the humps 74 on the three cams 73 is such that the limit switches 22d, 22e and 22f are closed for a period of time before the limit switches 22a, 22b and 22c of Figure 2 are opened, but after the extra skip has gone up and the small bell has been dumped. It will be seen from the foregoing that when the superintendent or blower transmits instructions down to the scale car operator over the intercomunication telephone calling for an extra skip of either coke, stone or ore, the act of the scale car operation in depressing either one of the extra skip buttons 61, 62 or 63 will set up a condition which will result in the advancement of the appropriate totalizing counter 50d, 50e or 50f as soon as the extra skip has been loaded with the desired material and sent up to the top of the furnace. In the performance of this extra-skip operation, the energization of either one of the extra skip relays 67, 68 or 69 isolates the advance coil 30d of the stepping switch 30 (through relay contacts 67c, 68c or 69c), so that the pre-established program which has been set up on the main control panel is not disturbed or otherwise affected. The scale car operator sees to it that the appropriate material is loaded into the extra skip, and that this extra skip is hoisted to the top of the furnace and dumped into the furnace. By virtue of the above isolating function performed by the relay contacts 67c—69c, this extra skip operation all takes place without causing operation of the skip-selecting rotary switch 30. If it should be desirable or necessary for the superintendent to countermand these instructions for the charging of an extra skip load of coke, ore or stone, before the skip has been hoisted, he can communicate these countermanding instructions to the scale car operator who then presses the reset button 64, which opens the supply circuit to the extra skip relays 67—69 and interrupts the locked up relation of any one of these relays, whereby that relay can immediately return to normal. In the meantime, there has been no advancement of any totalizing counter 50d—50f by reason of the control exercised by limit switches 22d—22f.

Referring now to the apparatus for enabling a skip load to be omitted from the pre-established program without disturbing the remainder of the program, this apparatus consists simply of the omit push button 65 on the scale car operator's panel 28 which has two switch contacts 65' that are connected in shunt across relay contacts 32c and across relay contacts 33c (Figure 2). Hence, the actuation of this omit skip push button 65 immediately transmits a stepping pulse of current to the advancing coil 30d of the rotary switch 30 for stepping this switch forwardly one step, the push button 65 being thereupon released. This one step advancement of the skip selecting rotary switch 30 omits one skip load from that round of the preselected program. Upon the cessation of this single step advancement of the rotary switch, the system picks up again at the next skip load as though the omitted skip load had never been set up in the program. To illustrate this skip omitting operation, if the superintendent should decide to omit a certain skip load in the program, he would communicate instructions to the scale car operator that he wanted the next skip of material omitted. The scale car operator would then press the skip omitting button 65 on his panel 28 which would step the rotary switch 30 forwardly one step for omitting that skip load, in the manner above described.

Referring now to the general operation of the entire system, the main functioning of rotary switch 30 will first be described. The bell operating mechanism 17 for operating the small bell 16 is so controlled that the small bell transfers its load to the large bell 11 each time that one of the skip cars 19 or 19a hoists a new load to the top of the furnace. This specific control apparatus forms no part of the present invention and need not be described in detail because it is old and well known. In such operation of the small bell 16, the act of opening this bell closes the limit switches 21a and 21b. If the skip selector rotary switch 30 is in the position shown in Figure 2 and limit switch 20a (which is closed by the opening of the large bell 11) is open, a circuit is established from the positive bus over rotary switch arm 30h, stationary switch contact 30l, limit switch contacts 21a, relay contacts 32h and through the energizing coil 32a of relay 32 to the negative supply bus. Relay 32 will thus be energized and will be latched in by the latch responsive to release magnet 32b. When the small bell 16 recloses, such movement closes the contacts 21c of limit switch 21, whereupon a circuit is established from positive line through relay contacts 32c which have just now been closed and through limit switch contacts 21c to one side of the advancing coil 30d of rotary switch 30, the other side of which advancing coil is permanently connected to the negative supply bus. The energization of the advance coil 30d causes the rotary switch 30 to advance one step from its Off position to position 1, thereby establishing an energizing circuit for energizing the coil 33a of relay 33. That is to say, a circuit is now established from the positive supply bus over rotary switch arm 30h through stationary switch contact 30m, thence through limit switch contacts 21b and relay contacts 33h to one side of the relay operating coil 33a, the other side of which coil is connected to negative supply bus. Accordingly, the relay 33 will pick up and latch in as soon as the opening of the small bell 16 closes the limit switch contacts 21b. Another circuit is established from switch contact 30m through relay contacts 32d to release coil 32b, the other side of which is permanently connected to the negative supply bus, whereby the energization of release coil 32b causes the relay 32 to be dropped out. After relay 33 is energized, the small bell limit switches 21a and 21b open and the small bell limit switch 21c closes in response to the closing movement of the small bell. Thus, a circuit is established from the positive supply bus through relay contacts 33c, limit switch contacts 21c and thence through the advancing coil 30d to the other supply line, whereby the advancing coil 30d is energized and the stepping switch is advanced a second step to bring the rotary switch arm 30h into engagement with contact 30n. This engagement with stationary switch contact 30n energizes the release coil 33b of relay 33 after the next operation of the small bell 16, causing energization of the operating coil 32a of relay 32. Thus, the rotary switch 30 is advanced one step for each trip of the skips, until the limit switch 20a of the small bell closes to energize the resetting coil 30g of the rotary switch 30, which resetting coil releases the latch 30f, whereupon the rotary switch immediately returns to its starting position under the action of the return spring 30b.

We shall now describe the control of the coke, ore and stone indicating lights 48a, 48b, 48c, and their companion lights 48a', 48b' and 48c', which indicate to the scale car operator the material that is to be loaded into the next skip; and we shall also describe the control of the round indicating lights 49a and 49b and their companion lights 49a' and 49b' which indicate on both panels 27 and 28 the cycle on which the equipment is operating at a given moment. Let us assume that the furnace is to be charged by an alternating sequence of rounds A and B. Accordingly, the round selector controller 49c will be moved clockwise to its third position designated AB, such setting up the round selecting switches for an alternating sequence of the rounds. Let us also assume that the successive skip loads for the two rounds are to be as follows:

Round A: coke, coke, ore, stone
Round B: ore, coke, coke, stone

In the operation of setting up the above program on the main control panel 27 the following push buttons are depressed on the main control panel (which moves their contacts to the positions opposite to those shown in the circuit diagram):

For Round A: 40a, 41a, 42b, 43c
For Round B: 44b, 45a, 46a, 47c

The previously described operation of moving the round selector controller 49c to the round alternating position "AB" has caused switches 51a and 51c to close, has caused switch 51b to open, has caused switch 34u to open, and has caused switches 34v and 34w to close. In order to simplify the explanation, we shall assume further that #1 skip load of coke is already on the large bell 11, and that #2 skip load of coke is on the small bell 16. The rotary switch 30 is at its first stepping point #1 (beyond the Off or normal position), and the signal lights 31a and 31a' are now lighted through rotary switch arm 30i and stationary switch contact 30q. A circuit is established from the positive supply bus over rotary switch arm 30k, stationary switch contact 30v, relay contacts 37d, Off switch contacts 41d, push button switch contacts 42b to the ore bus bar 53 and thence through relay contacts 33f and through the counting coil relay 50b (for actuating the ore totalizing counter 50e). At the same time that the circuit is established down through the ore bus bar 53, a parallel circuit is branched therefrom down through the ore indicating lights 48b and 48b' to the negative supply bus. Pursuant to the instructions established by the ore indicating light 48b' on the scale car operator's panel 28, this operator fills the next skip with ore and sends it to the top of the furnace by the hoisting means 19b, 19c. In the meantime, the second skip load of coke is being discharged down onto the large bell 11, and simultaneously therewith the rotary stepping switch 30 advances to step 2, as already described, thus establishing a circuit through rotary switch arm 30k, stationary switch contact 30w, relay contacts 37e, Off switch contacts 42d, push button switch contacts 43c and thence to the stone bus 54 to energize the stone indicating lights 48c, 48c', and also to energize the stone counting relay 50c for imparting a one-step advancement to the stone totalizing counter 50f. It should be noted at this point that the counting relays 50a, 50b and 50c respectively are energized upon closure of the relays 32 or 33, i. e. one or another of the relays receives an impulse for each step of the rotary switch 30.

Pursuant to the lighting of the stone indicating light 48c' on the scale car operator's panel 28, this operator charges the next skip with stone and sends it up to be dumped on to the small bell 16, which had previously discharged the third skip load (ore) on to the large bell 11. The rotary switch 30 is now advanced to step #3 in the manner above described. This constitutes the end of Round A, for the time being.

Starting now with the beginning of Round B, we now start loading the skip for the first load of Round B, this calling for ore on skip load #1. A circuit is established from rotary switch arm 30k through stationary switch contact 30x and thence through push button switch contacts 43c (left hand), Off switch contacts 42d and 41d, relay contacts 37b, round selector control contacts 51c, push button switch contacts 44b and thence to the ore indicating bus 53 which actuates the ore totalizing counter 50e and lights the ore indicating lights 48b and 48b', thereby showing the scale car operator that ore is to be charged into the next skip. When skip #1 of Round B is sent up, skip #4 of Round A discharges on to the large bell. As soon as skip #4 of Round A is discharged into the small bell, and the latter in turn discharges into the large bell, the rotary switch 30 moves to step #4 in the manner previously described. A circuit is established from contact 30y (from rotary switch arm 30k) through push button switch contacts 43c (right center) and thence through relay contacts 37f to the controller 13a for the operation of the large bell.

The opening of the large bell 11 closes the limit switch contacts 20a, resulting in the energization of the reset coil 30g of stepping switch 30, thereby resulting in the stepping switch being returned to its "off" position, as above described. The next call is for coke in skip #2 of Round B. Opening of the large bell 11 also closes limit switch contacts 20b and 20d. The round selector rotary switch 34 is on step #1, and accordingly the operating coil 35a of relay 35 is energized by way of limit switch contacts 20b and relay contacts 35b, with the result that the relay 35 is locked in. This relay operation results in a circuit being completed from the positive supply bus through relay contacts 35f and through limit switch contacts 20d to the advancing coil 34d of rotary switch 34, thereby causing this round selecting rotary switch 34 to advance to step #2, such thereby completing a circuit to release coil 35e so as to effect the release of relay 35. After the large bell 11 has opened and reclosed, a circuit is also established through limit switch contacts 20c, relay contacts 36b and relay operating coil 36a, so as to close relay 36, which latches itself in. Movement of rotary switch arm 34k into engagement with stationary switch contact 34s operates to de-energize the round transfer relay 37 and to energize the other round transfer relay 38. As the skip selecting rotary switch 30 returns to its "off" position upon the opening of the large bell 11, a circuit is established from the positive supply bus over rotary switch arm 30k, stationary switch contact 30u, relay contacts 38c, push button switch contacts 45a to the coke indicating bus 52, so as to light the coke indicating lights 48a, 48a', thereby signalling to the scale car operator that coke is to be loaded into skip 2. The rotary switch arms 30h, 30i and 30k now step forwardly to their respective stationary contacts 30m, 30q and 30v, and operation of said relay continues in the manner described above in connection with Round A, except as illustrated in the following: The 3rd skip load of Round B calls for coke the corresponding circuit being through switch contact 30v, relay contacts 38d, push button switch contacts 45d (right center), push button switch contacts 46a and thence to the coke indicating bus bar 52. The fourth skip load calls for stone, which is signalled by a circuit through stationary switch contact 30w, relay contacts 38e, push button switch contacts 46d (right center), push button switch contacts 47c and thence to the stone indicating bus 54. This completes Round B.

If it is now desired to operate only in accordance with Round A (following a discontinuance of the previously described alternating operation of Rounds A and B), the round selector controller 49c is moved from the third position, shown in Figure 4 back to the first position, denoted by "A." Such operation of this controller causes the round selector switches 51a and 51b to close, causes the round selector switch 51c to open, causes the selector switches 34v and 34w to open, and causes the selector switch 34u to close. If the program for Round A is still to be coke, coke, ore and stone, the same as before, the push button switches 40a, 41a, 42b and 43c are again pressed inwardly to their actuated positions, opposite to the positions shown on the circuit diagram. After the last step of Round B in the previously described alternating sequence of Rounds A and B, there has been left one skip of coke on the large bell and one skip of stone on the small bell. The previous operation of the small bell moved the rotary switch 30 to point #3. It will be noted that now relay 37 is energized all of the time, as the round selecting rotary switch 34 cannot energize relay 38. Hence, a circuit is now established from rotary switch arm 30k, stationary switch contact 30x, push button switch contacts 43c (left hand), push button Off contacts 42d and 41d, relay contacts 37b, round selector control contacts 51b and push button switch contacts 40a to the coke indicating bus 52. Hence, coke will be called for by the illumination of the lights 48a and 48a', and the coke totalizing counter 50d will also be stepped forwardly one step. Thereafter, rotary switch arm 30k engages stationary switch contact 30y, which establishes a circuit from this contact through push button switch contacts 43c (center), relay contacts 37f and thence to large bell controller 13a, thereby actuating the large bell, as above described. Thereupon, the skip selecting rotary switch 30 is returned back to its "off" position, as already described, and it completes a circuit over rotary switch contact 30u, relay contacts 37c and push button switch contacts 41a to the coke indicating bus 52, thereby signalling through the signal lights 48a and 48a' that coke is called for in the second skip load. The operation thereafter will be apparent from the foregoing description.

If it is desired to end either one of the rounds at a lesser number of skip loads, one of the "d" push button switches is depressed (i. e. 41d, 42d, 43d, 45d, 46d or 47d). Let us assume, for example, that the system has been preset for continuous operation on the "A" round or cycle, and that the operator wants to load only two skips. He therefore depresses the push button 42d. As previously explained, the rotary switch 30 is at point #1. A circuit is established from the positive supply bus over rotary switch arm 30k, stationary switch contact 30v, Off push button switch 42d (left), Off push button switch 41d (left), relay contacts 37b, round selector switch contacts 51b and push button switch contacts 40a to the coke indicating bus 52, thereby signalling coke to the scale car operator. Accordingly, that operator fills the skip with coke and sends it to the top of the furnace by the conventional hoisting means 19. In the meantime, the second skip of coke is being discharged onto the large bell 11, and simultaneously the rotary switch 30 advances to step #2, as already described, thus establishing a circuit through rotary switch contact 30w, relay contacts 37e, Off push button switch contacts 42d (right), relay contacts 37f to the large bell controller 13a. Thereupon, the large bell discharges its fractional round into the furnace and the controller resets itself for a repetition of the preset cycle, as has been described. If it is desired to again charge the furnace with the normal number of skip loads, the "d" buttons which were depressed are returned to their "off" position, which causes the equipment to operate with the full number of previously preset skip loads. It will be observed that none of the lights 48a, 48a', 48b, 48b' or 48c, 48c' are energized, thus indicating "no load" to the operator. In all other respects the system operates as above described for the normal A cycle.

While we have illustrated and described what we regard to be the preferred embodiment of our invention, nevertheless it will be understood that such is merely exemplary and that numerous modifications and rearrangements may be made therein without departing from the essence of the invention.

We claim:

1. In a charging program control and indicating system for a blast furnace wherein the coke, ore and stone are adapted to be conveyed by skip hoist means to a hopper provided with a cooperating bell, the combination of a series of manually presettable ore and stone designating switches adapted to be preset in accordance with a predetermined skip load charging program, rotary switch means adapted to be actuated by said skip hoist means, and indicating means responsive to the manually preset positions of said designating switches and to the operation of said rotary switch means for indicating the material to be loaded into the skip hoist means in the successive trips of the charging program.

2. In a charging program control and indicating system for a blast furnace wherein the coke, ore and stone are adapted to be conveyed by skip hoist means to a hopper provided with a cooperating bell, the combination of a series of manually presettable ore and stone designating switches adapted to be preset at the beginning of a charging round in accordance with a predetermined skip load charging program, a rotary stepping switch, means responsive to the operation of said bell for stepping said switch, and indicating means responsive to the manually preset positions of said manually presettable designating switches and to the operation of said rotary stepping switch for indicating the material to be loaded in the skip hoist in the different skip loads of the charging program.

3. In a charging program control and indicating system for a blast furnace wherein the coke, ore and stone are adapted to be conveyed by skip hoist means to a hopper above the furnace provided with upper and lower bells, the combination of a first bank of manually presettable coke, ore and stone designating switches adapted to be preset in accordance with a predetermined skip load program for a first charging round, a second bank of manually presettable coke, ore and stone designating switches adapted to be preset in accordance with a predetermined skip load program for a second charging round, a first rotary stepping switch, means responsive to the operation of said upper bell for governing the stepping of said first rotary switch, a second rotary stepping switch, means responsive to the operation of said lower bell for governing the stepping of said second rotary stepping switch, charge indicating means responsive to the manually preset positions of said designating switches in both banks and to the operation of one of said rotary switches for indicating the material to be loaded into the skip hoist means in the successive skip loads of both charging rounds, and round indicating means responsive to the operation of one of said rotary switches for indicating the charging round then in operation.

4. In a charging program control and indicating system for a blast furnace wherein the coke, ore and stone are conveyed by skip car apparatus to a receiving hopper above the furnace provided with small and large bells, and wherein the small bell is adapted to open and transfer its load to the large bell each time that the skip car apparatus conveys a new load to the receiving hopper, the combination of limit switch contacts responsive to the opening and closing of the small bell, a rotary stepping switch, a pair of control relays connected with said limit switch contacts and with said rotary stepping switch whereby said control relays are energized alternately with successive trips of said skip car apparatus and effect successive stepping of said rotary switch, a series of manually presettable ore and stone designating switches adapted to be preset in accordance with a predetermined skip load charging program, and indicating means responsive to the manually preset positions of said designating switches and to the operation of said rotary stepping switch for indicating the material to be loaded in the skip car apparatus in the successive skip loads of the charging program.

5. In a charging program control and indicating system for a blast furnace wherein the coke, ore and stone are conveyed by skip car apparatus to a receiving hopper above the furnace provided with small and large bells, and wherein the small bell is adapted to open and transfer its load to the large bell each time that the skip car apparatus conveys a new load to the receiving hopper, the combination of limit switch contacts responsive to the opening and closing of the small bell, a rotary stepping switch, a pair of control relays connected with said limit switch contacts and with said rotary stepping switch whereby said control relays are energized alternately with successive trips of said skip car apparatus and effect successive stepping of said rotary switch, a series of manually presettable ore and stone designating switches adapted to be preset in accordance with a predetermined skip load charging program, indicating means responsive to the manually preset positions of said designating switches and to the operation of said rotary stepping switch for indicating the material to be loaded in the skip car apparatus in the successive skip loads of the charging program, and means responsive to the opening of said large bell for resetting said rotary stepping switch to a normal position.

6. In a charging program control and indicating system for a blast furnace wherein the coke, ore and stone are conveyed by skip car apparatus to a receiving hopper above the furnace provided with small and large bells, and wherein the small bell is adapted to open and transfer its load to the large bell each time that the skip car apparatus conveys a new load to the receiving hopper, the combination of limit switch contacts responsive to the opening and closing of the small bell, a rotary stepping switch, a pair of control relays connected with said limit switch contacts and with said rotary stepping switch whereby said control relays are energized alternately with successive trips of said skip car apparatus and effect successive stepping of said rotary switch, a series of manually presettable ore and stone designating switches adapted to be preset in accordance with a predetermined skip load charging program, indicating means responsive to the manually preset positions of said designating switches and to the operation of said rotary stepping switch for indicating the material to be loaded in the skip car apparatus in the successive skip loads of the charging program, and means responsive to said rotary stepping switch for opening said large bell.

7. In a charging program control and indicating system for a blast furnace wherein the coke, ore and stone are conveyed by skip car apparatus to a receiving hopper above the furnace provided with small and large bells, and wherein the small bell is adapted to open and transfer its load to the large bell each time that the skip car apparatus conveys a new load to the receiving hopper, the combination of limit switch contacts responsive to the opening and closing of the small bell, a rotary stepping switch, a pair of control relays connected with said limit switch contacts and with said rotary stepping switch whereby said control relays are energized alternately with successive trips of said skip car apparatus and effect successive stepping of said rotary switch, a series of manually presettable ore and stone designating switches adapted to be preset to set up indications designating whether ore or stone is to be dumped into the skip car apparatus in successive skip loads in accordance with a predetermined charging program, indicating means responsive to the manually preset positions of said designating switches and to the operation of said rotary stepping switch for indicating the material to be loaded in the skip car apparatus in the successive skip loads of the charging program, means responsive to said rotary stepping switch for opening said large bell, and means responsive to the opening of said large bell for resetting said stepping switch back to its normal position.

8. In a charging program control and indicating system for a blast furnace wherein the coke, ore and stone are conveyed by skip car apparatus to a receiving hopper above the furnace provided with small and large bells, and wherein the small bell is adapted to open and transfer its load to the large bell each time that the skip car apparatus conveys a new load to the receiving hopper, the combination of a first rotary stepping switch, means responsive to the skip loads delivered to the small bell for governing the stepping of said first stepping switch, a second rotary stepping switch, means responsive to the operation of said large bell for governing the stepping of said second stepping switch, a first bank of manually presettable ore and stone designating switches adapted to be preset to set up indications designating whether ore or stone is to be dumped into the skip car apparatus in successive skip loads in accordance with a predetermined program for a first charging round, a second bank of manually presettable ore and stone designating switches adapted to be preset to set up indications designating whether ore or stone is to be dumped into the skip car apparatus in successive skip loads in accordance with a predetermined program for a second charging round, charge indicating means responsive to the manually preset positions of said designating switches in both banks and to the operation of said first rotary switch for indicating the material to be loaded into the skip car apparatus in the successive skip loads of both charging rounds, and round indicating apparatus responsive to the operation of said second stepping switch for indicating the charging round then in operation.

9. In a charging program control and indicating system for a blast furnace wherein the coke, ore and stone are conveyed by skip car apparatus to a receiving hopper above the furnace provided with small and large bells, and wherein the small bell is adapted to open and transfer its load to the large bell each time that the skip car apparatus conveys a new load to the receiving hopper, the combination of a first rotary stepping switch, means responsive to the skip loads delivered to the small bell for governing the stepping of said first stepping switch, a second rotary stepping switch, means responsive to the operation of said large bell for governing the stepping of said second stepping switch, a first bank of manually presettable coke, ore and stone designating switches adapted to be preset to set up indications designating whether coke, ore or stone is to be dumped into the skip car apparatus in successive skip loads in accordance with a predetermined program for a first charging round, a second bank of manually presettable coke, ore and stone designating switches adapted to be preset to set up indications designating whether coke, ore or stone is to be dumped into the skip car apparatus in successive skip loads in accordance with a predetermined program for a second charging round, charge indicating means responsive to the manually preset positions of said designating switches in both banks and to the operation of said first rotary switch for indicating the material to be loaded into the skip car apparatus in the successive skip loads of both charging rounds, skip load indicating means responsive to said first stepping switch for indicating the number of skip loads resting on the large bell, means responsive to motion of said first stepping switch to a predetermined position for causing said large bell to open, means responsive to the opening of said large bell for resetting said first rotary stepping switch, and round indicating means responsive to the operation of said second rotary stepping switch for indicating the charging round then in operation.

10. In a charging program control and indicating system for a blast furnace wherein the coke, ore and stone are conveyed by skip car apparatus to a receiving hopper above the furnace provided with small and large bells, and wherein the small bell is adapted to open and transfer its load to the large bell each time that the skip car apparatus conveys a new load to the receiving hopper, the combination of a first rotary stepping switch, means responsive to the skip loads delivered to said small bell for governing the stepping of said first stepping switch, a second rotary stepping switch, means responsive to the operation of said large bell for governing the stepping of said second stepping switch, means responsive to the operation of said first stepping switch for causing said large bell to open, means responsive to the opening of said large bell for resetting said first stepping switch to normal position, two series of manually presettable selecting switches adapted to be preset to set up indications designating whether ore or stone is to be dumped into the skip car apparatus in successive skip loads in accordance with a predetermined program for two different charging rounds, charge indicating means responsive to the manually preset positions of said selecting switches in both series and to the operation of said first stepping switch for indicating the material to be loaded into the skip car apparatus in the successive skip loads of both charging rounds, round transfer relays coacting with said second stepping switch, and round indicating means responsive to said second stepping switch and to said round transfer relays for indicating the charging round then in operation.

11. In a charging program control and indicating system for a blast furnace wherein the coke, ore and stone are conveyed by skip car apparatus to a receiving hopper above the furnace provided with small and large bells, and wherein the small bell is adapted to open and transfer its load to the large bell each time that the skip car apparatus conveys a new load to the receiving hopper, the combination of a series of manually presettable selecting switches adapted to be preset to set up indications designating whether ore or stone is to be dumped into the skip car apparatus in successive skip loads in accordance with a predetermined charging program, rotary switch means adapted to be actuated by the operation of said small bell, indicating means responsive to the manually preset positions of said selecting switches and to the operation of said rotary switch means for indicating the material to be loaded into the skip car apparatus in the different skip loads of the charging program, and skip load indicating means responsive to said rotary switch means for indicating the number of loads which have been discharged onto the large bell.

12. In a charging program control and indicating system for a blast furnace wherein the coke, ore and stone are adapted to be conveyed by skip hoist means to a hopper above the furnace, the combination of a first bank of manually presettable selecting switches adapted to be preset to set up indications designating whether ore or stone is to be dumped into the skip hoist means in successive skip loads in accordance with the predetermined program for a first charging round, a second bank of manually presettable selecting switches adapted to be preset to set up indications designating whether ore or stone is to be dumped into the skip hoist means in successive skip loads in accordance with the predetermined program for a second charging round, a stepping switch, means responsive to the skip loads delivered to said hopper for governing the operation of said stepping switch, and charge indicating means responsive to the manually preset positions of said selecting switches in both banks and to the operation of said rotary switch for indicating the material to be loaded into the skip hoist means in the successive skip loads of both charging rounds.

13. In a charging program control and indicating system for a blast furnace wherein the coke, ore and stone are adapted to be conveyed by skip hoist means to a hopper above the furnace, the combination of a first bank of manually presettable selecting switches adapted to be preset to set up indications designating whether coke, ore or stone is to be dumped into the skip hoist means in successive skip loads in accordance with the predetermined program for a first charging round, a second bank of manually presettable selecting switches adapted to be preset to set up indications designating whether coke, ore or stone is to be dumped into the skip hoist means in successive skip loads in accordance with the predetermined program for a second charging round, a stepping switch, means responsive to the skip loads delivered to said hopper for governing the operation of said stepping switch, charge indicating means responsive to the manually preset positions of said selecting switches in both banks and to the operation of said rotary switch for indicating the material to be loaded into the skip hoist means in the successive skip loads of both charging rounds, and means enabling the system to be converted to operate only in accordance with the predetermined program of the first charging round.

14. In a charging program control and indicating system for a blast furnace wherein the coke, ore and stone are adapted to be conveyed by skip hoist means to a hopper provided with a cooperating bell, the combination of a series of manually presettable selecting switches adapted to be preset to set up indications designating whether ore or stone is to be dumped into the skip hoist means in successive skip loads in accordance with a predetermined charging program, rotary switch means adapted to be actuated by said skip hoist means, indicating means responsive to the manually preset positions of said selecting switches and to the operation of said rotary switch means for indicating the material to be loaded into the skip hoist means in the successive trips of the charging program, and means for enabling a skip load which had previously been preset in the charging program to be omitted from the program.

15. In a charging program control and indicating system for a blast furnace wherein the coke, ore and stone are adapted to be conveyed by skip hoist means to a hopper above the furnace provided with upper and lower bells, the combination of a first bank of manually presettable selecting switches adapted to be preset to set up indications designating whether ore or stone is to be dumped into the skip hoist means in successive skip loads in accordance with the predetermined program for a first charging round, a second bank of manually presettable selecting switches adapted to be preset to set up indications designating whether ore or stone is to be dumped into the skip hoist means in successive skip loads in accordance with a predetermined program for a second charging round, a stepping switch, means responsive to the skip loads delivered to said upper bell for governing the stepping of said stepping switch, charge indicating means responsive to the manually preset positions of said selecting switches in both banks and to the operation of said stepping switch for indicating the material to be loaded into the skip hoist means in the successive skip loads of both charging rounds, and means actuatable after the charging programs have been preset in both banks of manually presettable selecting switches for enabling a skip load to be omitted from the program of either bank.

16. The combination with a cyclically operating material handling system for receiving successive batches of different classes of material at a skip loading station and for discharge thereof into the receiving hopper of a blast furnace, of presettable switching means arranged for setting up indications designating the order in which the batches of the different classes of material are to be received, signalling means responsive to said presettable switching means for indicating the material to be loaded into the skip at the skip loading station, and indicating means for indicating the number of loads which have been discharged to said receiving hopper.

17. The combination with a cyclically operating material handling system for receiving successive batches of different classes of material at a skip loading station and for discharge thereof into the receiving hooper of a blast furnace, of presettable switching means arranged for setting up indications designating the order in which the batches of the different classes of material are to be received, and signalling means responsive to said presettable switching means for indicating the material to be loaded into the skip at the skip loading station.

18. In a charging program control and indicating system for a blast furnace wherein the coke, ore and stone are adapted to be conveyed by skip hoist means to a hopper provided with a cooperating bell, the combination of a series of manually presettable ore and stone designating switches adapted to be preset in accordance with a predetermined skip load charging program, rotary switch means adapted to be actuated by said skip hoist means, indicating means responsive to the manually preset positions of said selecting switches and to the operation of said rotary switch means for indicating the material to be loaded into the skip hoist means in the successive trips of the charging program, and counting means operatively connected with said system for counting the number of skip loads of the different materials.

19. In a charging program control and indicating system for a blast furnace wherein the coke, ore and stone are adapted to be conveyed by skip hoist means to a hopper provided with a cooperating bell, the combination of a series of manually presettable ore and stone designating switches adapted to be preset in accordance with a predetermined skip load charging program, rotary switch means adapted to be actuated by said skip hoist means, indicating means responsive to the manually preset positions of said selecting switches and to the operation of said rotary switch means for indicating the material to be loaded into the skip hoist means in the successive trips of the charging program, and extra-skip apparatus operatively connected with said system so as to enable an extra skip load of either one of said materials to be charged into the furnace without disturbing said predetermined charging program set up on said series of selecting switches.

20. In a charging program control and indicating system for a blast furnace wherein the coke, ore and stone are adapted to be conveyed by skip hoist means to a hopper provided with a cooperating bell, the combination of a series of manually presettable ore and stone designating switches adapted to be preset in accordance with a predetermined skip load charging program, rotary switch means adapted to be actuated by said skip hoist means, indicating means responsive to the manually preset positions of said selecting switches and to the operation of said rotary switch means for indicating the material to be loaded into the skip hoist means in the successive trips of the charging program, and omit-skip apparatus operatively connected with said system so as to enable a skip load to be omitted from the predetermined charging program set up on said series of selecting switches without disturbing the remainder of the program.

21. In a charging program control and indicating system for a blast furnace wherein the coke, ore and stone are adapted to be conveyed by skip hoist means to a hopper provided with a cooperating bell, the combination of a series of manually presettable ore and stone designating switches adapted to be preset in accordance with a predetermined skip load charging program, rotary switch means adapted to be actuated by said skip hoist means, indicating means responsive to the manually preset positions of said selecting switches and to the operation of said rotary switch means for indicating the material to be loaded into the skip hoist means in the successive trips of the charging program, counting means operatively connected with said system for counting the number of skip loads of the different materials charged into the furnace, extra-skip load apparatus enabling an extra-skip load to be charged into the furnace without disturbing said predetermined charging program, means enabling said extra skip load to be countermanded, and means for causing the response of said counting means to said extra skip load to be delayed until after said bell has operated.

No references cited.